United States Patent
Nessim et al.

(10) Patent No.: US 11,467,304 B1
(45) Date of Patent: Oct. 11, 2022

(54) HIGH-RESOLUTION SEISMIC METHOD AND SYSTEM FOR DETECTING UNDERGROUND ARCHEOLOGIC STRUCTURES

(71) Applicants: Maurice Nessim, Houston, TX (US); Nicolae Moldoveanu, Nice (FR)

(72) Inventors: Maurice Nessim, Houston, TX (US); Nicolae Moldoveanu, Nice (FR)

( * ) Notice: Subject to any disclaimer, the term of this patent is extended or adjusted under 35 U.S.C. 154(b) by 0 days.

(21) Appl. No.: 17/719,141

(22) Filed: Apr. 12, 2022

(51) Int. Cl.
G01V 1/34 (2006.01)
G01V 1/32 (2006.01)
G01V 1/22 (2006.01)

(52) U.S. Cl.
CPC ............. *G01V 1/345* (2013.01); *G01V 1/22* (2013.01); *G01V 1/32* (2013.01)

(58) Field of Classification Search
CPC ............ G01V 1/345; G01V 1/22; G01V 1/32
See application file for complete search history.

(56) References Cited

U.S. PATENT DOCUMENTS

2010/0220895 A1\* 9/2010 Koren .................. G01V 1/34
382/109

FOREIGN PATENT DOCUMENTS

AU 2012332757 A1 \* 6/2014 ............ G01V 1/286
AU 2013230205 A1 \* 10/2014 ............ G01V 1/286

\* cited by examiner

*Primary Examiner* — Daniel Pihulic
(74) *Attorney, Agent, or Firm* — Hunton Andrews Kurth LLP

(57) ABSTRACT

The present application pertains to methods and systems for detecting an underground archeologic structure. The method comprises transmitting P (longitudinal)-waves and S (shear)-waves into the earth. Reflected P (longitudinal)-waves and reflected S (shear)-waves are then received using one or more receivers located on the surface of the earth and one or more receivers located beneath the surface of the earth. The underground archeologic structure is identified using a differentiation between the one or more receivers located on the surface of the earth and the one or more receivers located beneath the surface of the earth.

20 Claims, 6 Drawing Sheets

HIGH-RESOLUTION SEISMIC METHOD AND SYSTEM FOR DETECTING UNDERGROUND ARCHEOLOGIC STRUCTURES

BACKGROUND AND SUMMARY

Ground Penetrating Radar, Electrical Resistivity Tomography, Magnetometry, Gravimetry and Seismic refraction are some of the commonly-used techniques for geophysical investigation of archeological sites. These techniques, in simple geological and topographical environments, may provide results that can be employed by archaeologists to excavate and find buried structures related to ancient times.

However, the results of these types of geophysical investigations can be ambiguous due to high uncertainty associated with the measurements and interpretation of the results. For example, the archeological structures may be covered by complex topography, and this will add more ambiguity to the results. Thus, it may be beneficial to provide an exemplary system, method, and computer-accessible medium to analyze geological and topographical environments to detect, e.g., underground structures, which can overcome at least some of the deficiencies described herein above.

The known techniques used for geophysical investigation of the archeological sites provide uncertain results. A case in point is a recent geophysical investigation in the Valley of the Kings, located near Luxor, Egypt, where numerous ancient structures and tombs have been found over the years. FIGS. 1 and 2 show images of the complex topography of the Valley of the Kings that covers the archeological structures. FIG. 3 shows the dimension of the discovered underground structures in the Valleys of the Kings. The measured dimensions of KV5 structure (FIG. 2) include a maximum height of 2.85 m, width of 0.61~15.43 m and length of 443.2 m. The depth of the underground archeological structures in the Valley of the Kings is between 150 m and 270 m (FIG. 4). FIG. 4 is an elevation map (in meters) of the underground structures in the Valley of the Kings. A geophysical investigation in the Valley of the Kings was performed in 2018 using Electrical Resistivity Tomography (ERT), Ground Penetrating Radar (GPR) and High Density Geomagnetic (GM) techniques. The results of this geophysical investigation did not lead to any new discoveries, or to the mapping of the known ancient underground structures. See Francesco Porceli et al. (2020), Integrated Geophysics and Geomatics Surveys in the Valley of the Kings, Sensor, 2020, 20(6), 1552; https://doi.org/10.3390/s20061552. The results of this latest investigation based on typical geophysical methods used for archeologic studies (see above) support the need for a different approach.

The exemplary system, method and computer-accessible medium, according to an exemplary embodiment of the present disclosure, generally relate to the use of 3D high resolution seismic using P and S waves for data acquisition, processing and imaging. In one embodiment the application pertains to a method for detecting an underground archeologic structure. The method comprises transmitting P (longitudinal)-waves and S (shear)-waves into the earth. Reflected P (longitudinal)-waves and reflected S (shear)-waves and/or PSv converted waves are then received using one or more receivers located on the surface of the earth and one or more receivers located beneath the surface of the earth. The underground archeologic structure may be identified from seismic images that are generated from the P waves and S waves recorded with the one or more receivers located on the surface of the earth and/or beneath the surface, e.g., inside of the earth, in cases when underground structures exist and/or are accessible. In some embodiments a differentiation may be used between the one or more receivers located on the surface of the earth and the one or more receivers located beneath the surface of the earth to identify or assist in identifying the underground archeologic structure.

In another embodiment the application pertains to a system for detecting an underground archeologic structure. The system comprises one or more transmitters configured to transmit P (longitudinal)-waves and S (shear)-waves into the earth. One or more receivers are located on the surface of the earth configured to receive and record reflected P (longitudinal)-waves and reflected S (shear)-waves and/or PSv converted waves. One or more receivers may be located beneath the surface of the earth (e.g., where an underground structure is accessible) configured to receive and record reflected P (longitudinal)-waves and reflected S (shear)-waves and/or PSv converted waves. A processor is configured to generate seismic images for P-waves, S-waves, and/or PSv waves using the one or more receivers located on the surface of the earth, the one or more receivers located beneath the surface of the earth (if present). The seismic images may be used to identify the underground archeologic structure.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

As used herein S waves are shear waves, P waves are longitudinal waves, SH waves are horizontally polarized shear surface waves, P-SV (or also known as PSv) waves are mode-converted waves.

Data Acquisition Procedures

In one example embodiment, 3D high resolution seismic acquisition and/or 3D high resolution signal processing and imaging techniques can be used for detecting underground structures. The 3D high resolution seismic acquisition and/ or 3D high resolution signal processing and imaging techniques can be particularly beneficial when the underground structures have small dimensions, the topography is complex and/or there are inhomogeneities near surface. In one example embodiment, an acquisition and imaging technology that comprises using longitudinal waves (P-waves) and/or shear waves (S waves, SH-waves and PS waves) can be used.

In one example embodiment, using the shear waves, in addition to the longitudinal waves, can be beneficial for at least one or more of the following reasons. First, the resolution of the shear waves can be higher than the resolution of the P-waves due to lower velocity propagation of the shear waves (smaller wavelengths). Therefore, shear waves can provide higher quality images (or data). Second, unlike longitudinal waves, shear waves do not propagate through fluids or gases (air). This feature could allow one to identify underground structures such as chambers, corridors, or even large objects that are filled with air. It has been discovered that determining the velocity of the shear waves based on the processing of shear wave data, a more accurate elastic model can be derived for elastic imaging. In addition, rock lithology can be inferred based on velocity ratio of P-wave velocity over S-wave velocity, i.e., $V_p/V_s$ ratio, where $V_p$=P-wave velocity and $V_s$=shear wave velocity.

Figure 1:
FIG. 1 is an image of Valley of the Kings area showing the complex topography covering underground structures.
Figure 2:
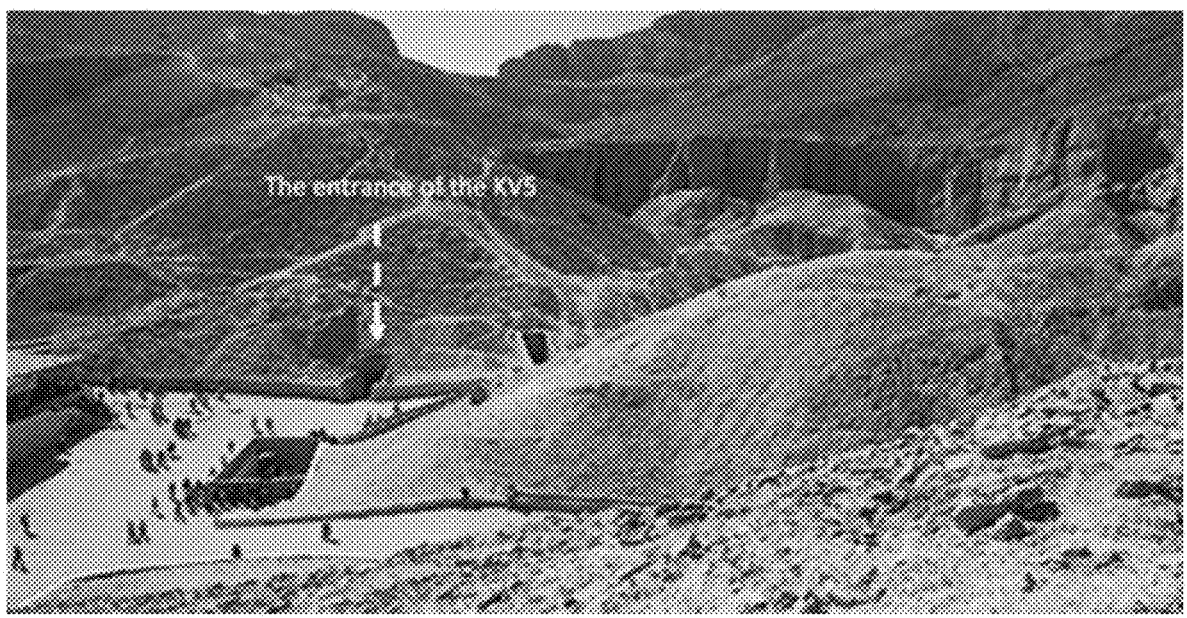
FIG. 2 is an image of Valley of the Kings area showing the entrance in one of the underground structures.
Figure 3:
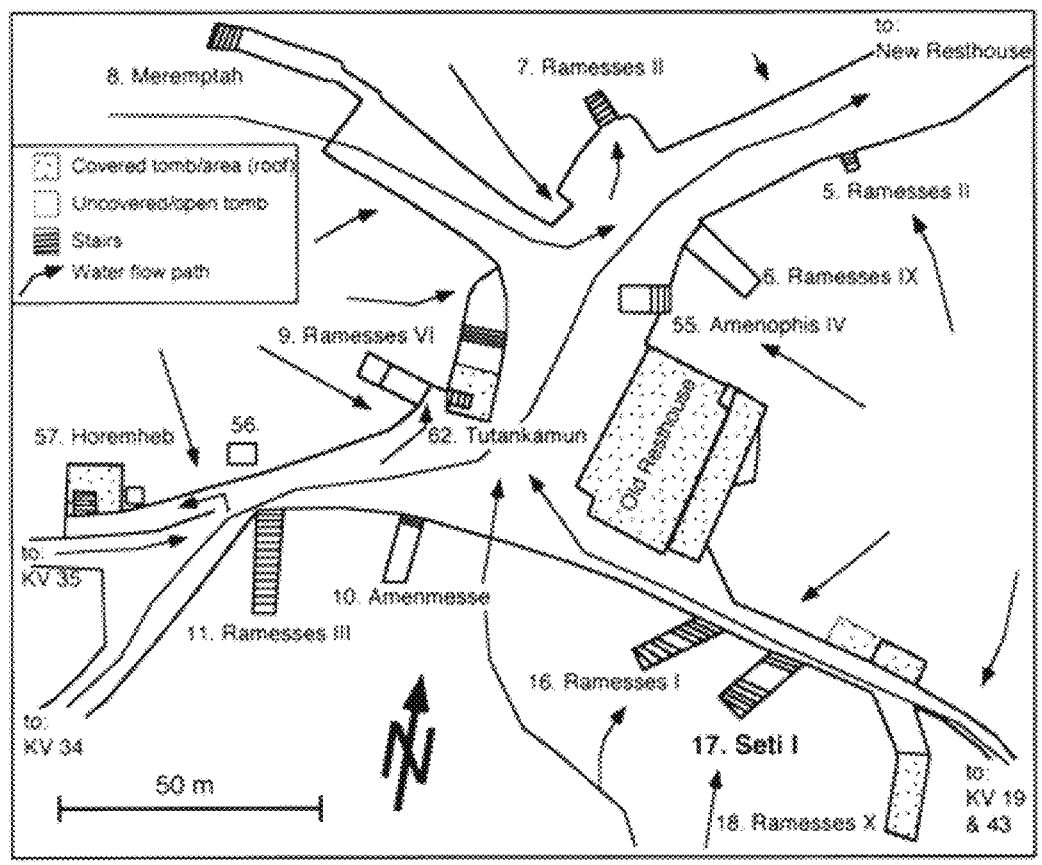
FIG. 3 is a map showing the discovered underground structures in the Valley of the Kings and dimensions of these structures.
Figure 4:
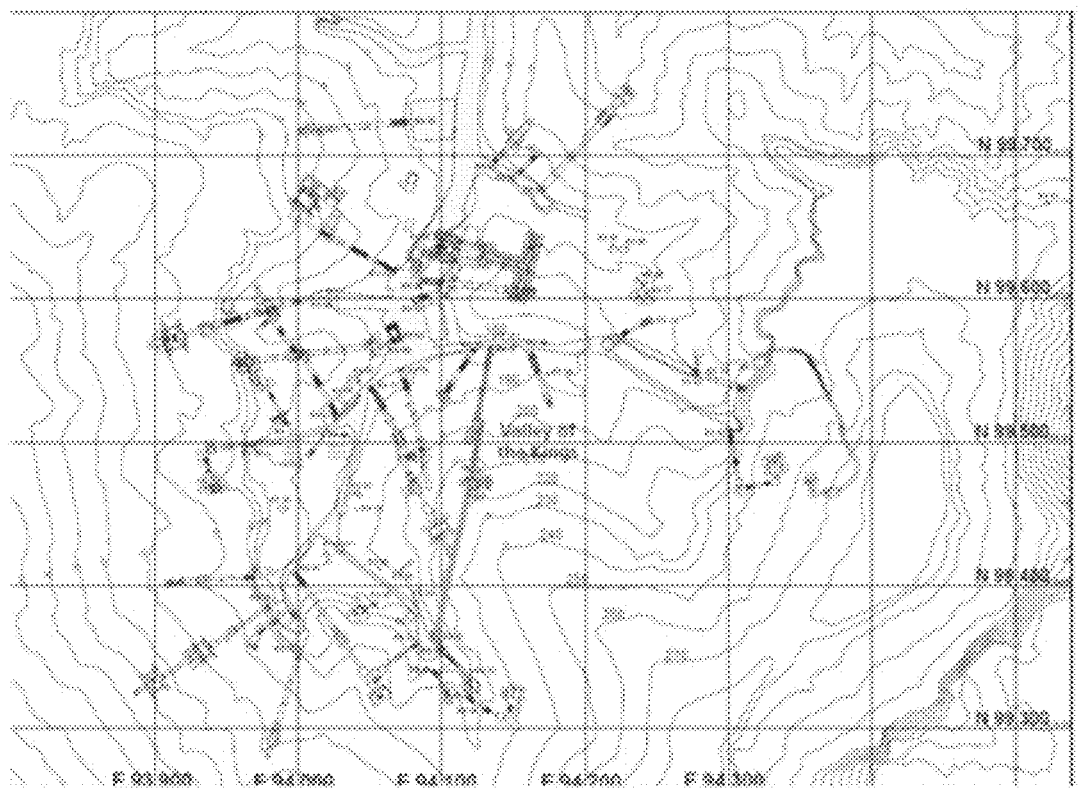
FIG. 4 is an elevation map (in meters) of the underground structures in the Valley of the Kings.
Figure 5:
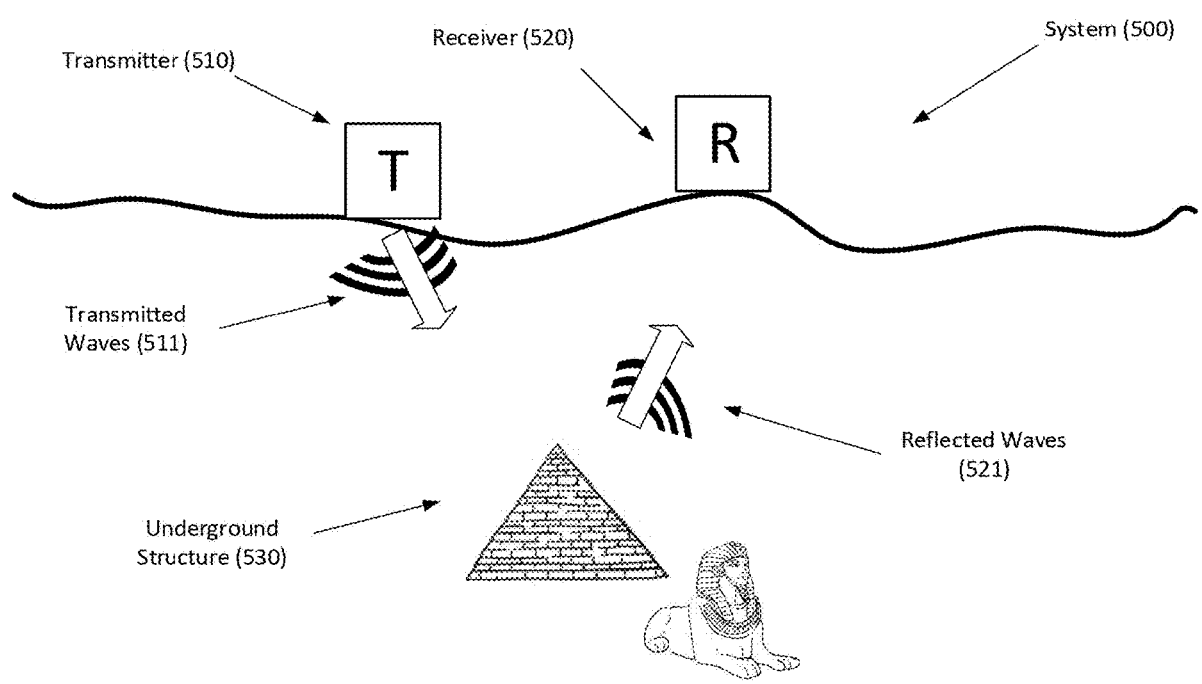
FIG. 5 shows an exemplary system 500 for detecting underground structures according to an example embodiment of the present disclosure.

FIG. 5 shows an exemplary system 500 for detecting underground structures according to an example embodiment of the present disclosure. The exemplary system, method and computer-accessible medium, according to an exemplary embodiment of the present disclosure, can include a transmitter 510 and a receiver 520. The transmitter 510 can generate waves 511, e.g., longitudinal waves and/or shear waves. The transmitted waves 511 can travel underground and hit the underground structure 530. The transmitted waves 511 can then be reflected as reflected waves 521 and travel to the receiver 520. The receiver 520 can receive the reflected, transmitted, diffracted, and/or refracted waves 521.

A number of criteria may be employed for selection of one or more sources which criteria and selected sources may vary depending upon the application. Typically one may wish to select sources that a) generate P-waves and S-waves; b) do not damage the underground structures; and/or c) are easy to deploy in the chosen environment or in some cases useful in any environment. In one example embodiment, the transmitter 510 can be a hammer source or portable vibrators.

A number of criteria may be employed for selection of one or more receivers which criteria and selected receivers may vary depending upon the application. Typically one may wish to select receivers that have the capability to record the seismic wavefield in X, Y and Z directions. In some applications this would mean that the device comprises sensors (geophones or MEMS) oriented in X, Y, and Z directions. The receivers may also be capable of autonomous recording and storing of data for a period of time that may vary depending upon the application. In some embodiments the period of time may be at least 1, or at least 2 or at least 3 days. In some embodiments it may also be advantageous if the receiver comprises a GPS receiver and may record the receiver position (x,y,z) for every shot point for at least receivers that are placed at or near the surface of the earth. Of course, if receivers are placed underground, then a different positioning metho may be employed depending upon the desired application. It may also be advantageous that the selected receiver(s) are easy to deploy in the chosen environment or in some cases useful in any environment. As a skilled artisan may appreciate, land node receivers such as those described may be commercially available from different seismic equipment manufacturers. As a non-limiting example GCL-3 from Geospace Technologies may be useful herein.

The transmitter 510 can generate longitudinal or P-waves and shear or S-waves. The exemplary receiver 520 can be a self-contained, three-component land wireless seismic data acquisition system. An example of such of device is the GCL-3.

Typically, for each seismic survey the acquisition geometry is defined before the survey is acquired. The specific manner may vary but may comprise defining the pattern of deployment of sources and receivers and the sampling of sources and receivers. This facilitates the determination of the offset and azimuth distribution associated with the acquisition.

The sampling of sources and receivers may be derived based on the desired or required resolution for imaging of the underground features as well as, any desired requirements related to attenuation of the coherent noise. Attenuation of the noise usually should be performed in manner such that the signal is relatively well preserved such that it is usable for further processing.

The offset and azimuth distribution should be based on the requirements to generate an accurate earth model of the subsurface based on seismic data, and on the imaging of seismic data using the derived earth model. If a vibroseis source is to be employed in the acquisition, the vibroseis sweep is typically defined before the acquisition. The sweep is the signal that the vibroseis source will transmit into the ground. The sweep parameters generally may comprise one or more up to all of the following: sweep length, start frequency, end frequency, type of sweep (liner or nonlinear), the sweep taper, and the number of sweeps to be generated per shot point.

In some embodiments a modeling and design study may be conducted prior to seismic acquisition to determine the required acquisition parameters for the specific archeological survey. A modeling and design study usually involves having an earth model of the area where an investigation will be conducted. The earth model typically contains velocities (Vp and Vs) and densities. This model may be generated based on the existent information in the area that could include geology, topography, accessibility, well-logs information (if available), and/or results from previous geophysical studies (if available).

The selection of the maximum offset usually involves a consideration of the target depth and the offset required for Full Waveform Inversion (FWI). Full Waveform Inversion is part of the processing sequence that is used to generate an accurate subsurface model based on seismic data. Application of FWI for archeological studies could allow one to determine the velocity variations in the subsurface and also to generate a high-resolution image of the subsurface by inverting for velocity and reflectivity. Synthetic seismic data corresponding to different acquisition geometries and associated acquisition parameters may be simulated using 3D finite difference elastic modeling or 3D finite element modeling. The generated seismic data for each geometry may be imaged using wave equation type imaging algorithms to generate a depth-image of the subsurface. Each image, corresponding to each acquisition geometry, may then be compared with the earth model. An acquisition geometry that provides a suitable match may then be selected for the study area. Also, in some embodiments FWI may be run on the synthetic data using a perturbed earth model to determine if the exact model (unperturbed) can be recovered, to validate the maximum offset proposed for the acquisition, and the minimum required low frequency for FWI. Based on imaging and FWI results acceptable to optimum acquisition parameters may be identified and a selection made.

In one example embodiment, the exemplary system, method and computer-accessible medium, according to an exemplary embodiment of the present disclosure, can include a plurality of transmitters (sources) and receivers. The placement of the sources and receivers in the field will be adapted to the topographic and accessibility conditions in the area. For example, the transmitters and receivers can be placed in a grid with non-uniform or pseudo-random locations.

Figure 6:
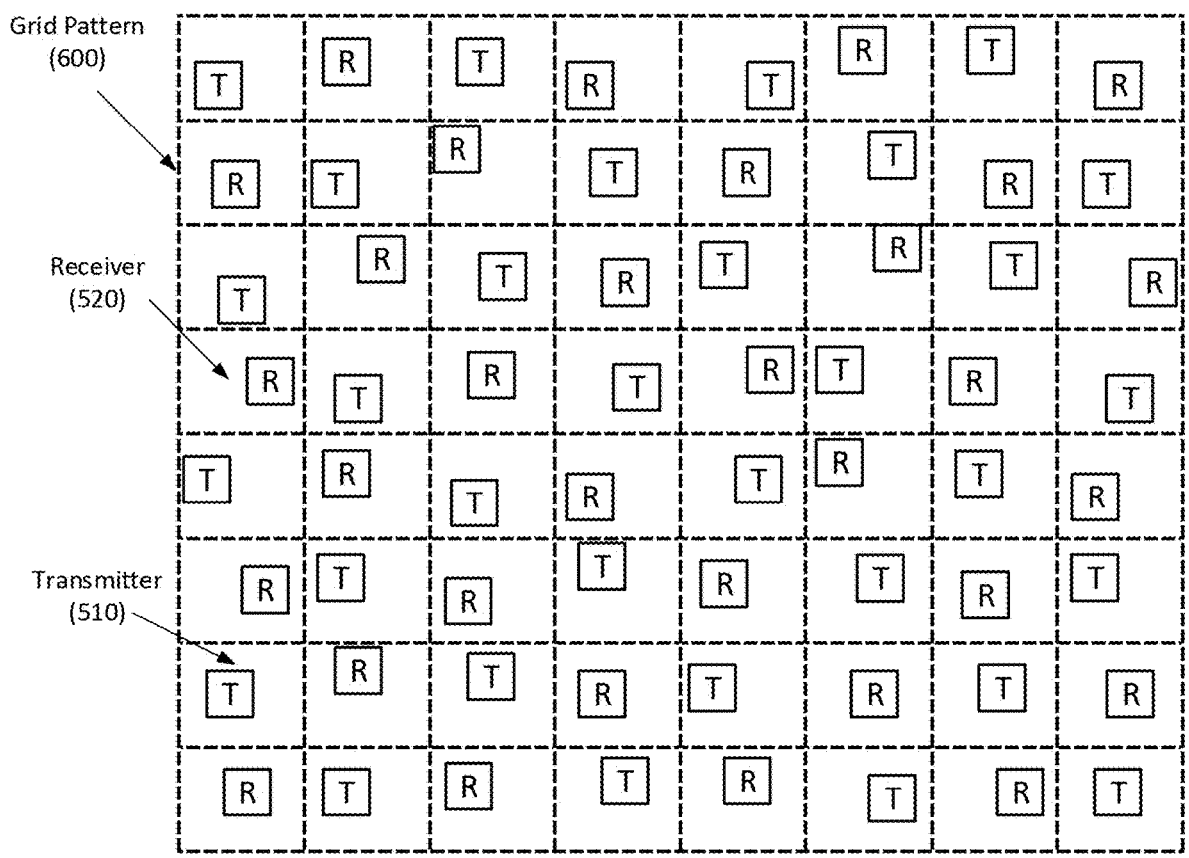
FIG. 6 shows an example grid pattern 600 of transmitters 510 and receivers 520 placed over an exemplary survey area in a pseudorandom configuration.

FIG. 6 shows an example grid pattern 600 of transmitters 510 and receivers 520 placed over an exemplary survey area in a pseudo-random distribution. The size of the grid can depend on the size of the area investigated, i.e., the survey area and/or on the maximum required offset. For example, if a high-resolution seismic survey is desired, e.g., in Valley of the Kings, the grids size can be in the order of 2 km×2 km.

In one example embodiment, where the existent underground structures are accessible, e.g., in Valley of the Kings, the receivers 520 can be placed inside these structures underground, in addition to or instead of the surface receivers. A difference in the response of the vertical geophones and horizontal geophones inside the existent structures may be observed. Placing the receivers inside the underground structures may bring one or more benefits. First, one may observe a differentiation between the responses of geophones placed at the surface at location (x,y) and geophone placed inside underground structures at the same (x,y) location. This may be due to various propagation effects like seismic attenuation, seismic scattering and multiple reflections. Of note, the seismic energy could bounce, up and down, inside the undergound structures, creating multiple reflections that affect the waveform. Secondly, a differentiation between horizontal and vertical geophone response for the geophones placed at the same (x,y) location at the surface of the earth may be observed. In some embodiments, the receiver deployment inside the underground structures may mimic the surface deployment but with a reduced interval between receivers in X- and Y-directions. Such mimicking and amount of reduced intervals may depend, for example, upon the dimensions of the underground structure.

Data Processing Procedures

In one example embodiment, after transmitting and receiving the waves at the transmitters 510 and receivers 520, the exemplary system, method and computer-accessible medium, according to an exemplary embodiment of the present disclosure, can process the information.

The typical processing sequence that is used for seismic data acquired onshore (land) may vary depending upon the application. Seismic data is often a collection of shot records wherein each shot record is a collection of seismic traces recorded by each receiver deployed in the field.

Typically, each seismic trace comprises a header and seismic data. In some applications the processing sequence may include one or more of the following steps:

a) Assigning the geometry information to each seismic trace such that x,y,z spatial coordinates for each shot and each receiver are generally be attached in the seismic trace headers;

b) Processing the data to reduce and/or remove the noise that can contaminate the signal. The noise affecting land data may often be classified as coherent noise and ambient or incoherent noise. The coherent noise comprises mainly source generated noise, for example the ground-roll. This type of noise is in surface waves that propagate along the surface of the earth or in the very near surface sediments. Incoherent noise may be generated by wind, traffic, engines, movement of vehicles, etc. There are many known methods that may be used for attenuation of the coherent and incoherent noise and a suitable method will be selected during data processing. Some examples of noise attenuation methods that may be employed alone or in combination included, for example, filtering of the noise in different domains, like FK (frequency—wave number domain), radon domain; modeling of noise and subtraction, SVD (single value decomposition) among others.

c) Generating a near surface model. The model may be based on one or both of the following information:

Digital Elevation Model of the area. This may be generated from, for example, remote sensing data (Lidar (optical data), satellite data (optical and radar data)) or elevation measurements.

Velocity of the near surface sediments. This information may be obtained from inversion of the surface waves and/or from existent geologic knowledge about the type of rocks and lithology. Lithology information may be also inferred from multispectral satellite measurements over the area.

d) Correcting, if and to the extent necessary, for the propagation effects through the near surface geology. The main types of effects that may be corrected during processing are:

Static corrections: compensate for differences in propagation time due to elevation variations of the sources and receivers and differences in near surface velocities Phase and amplitude changes due to variations in the near surface geology, scattering effects, seismic absorption.

The placement of receivers at the surface and inside the underground structure may allow for evaluating the absorption coefficient using a spectral ratio method.

e) Generating a velocity model for Vp and Vs from the recorded seismic data using, for example, Full Waveform Inversion. An initial velocity model may be generated using the near surface model and other geologic and well logs information from the area. Using this initial velocity model and the recorded data, several iterations of Full Waveform Inversion may be run to derive an acceptable up to optimum velocity model and to invert for reflectivity. Broadband frequency inversion of reflectivity could produce a high resolution seismic image of the subsurface. Full Waveform Inversion algorithms may be based on 3D acoustic wave propagation, 3D elastic wave propagation and/or 3D visco-elastic wave propagation or some combination thereof. For land data, using elastic (or visco-elastic) Full Waveform Inversion may generate more accurate results by taking into account P- and S-waves.

f) Attenuation of multiple reflections: in some geologic settings, when there are high impedance contrasts in the subsurface, the seismic energy could bounce between two interfaces and create multiple reflections. Multiple reflections could be used for imaging, or, if not used for imaging, are attenuated.

g) Interpolation of sources and receivers to higher density grids; there are different methods that are used for seismic data interpolation and the most adequate may be used. For example, interpolation based on compressing sensing theory may be used in certain applications. Note: this step may not be necessary if the sampling of the acquired data was based on the required resolution for accurate imaging of the underground structures h) Imaging of seismic data, P- and S-waves using wave equation-based methods (RTM, LSRTM) and Kirchhoff methods. The following subsurface images of the subsurface could be derived: P-image (longitudinal wave image), Sh-image (shear wave image), and/or PSv-image (converted wave image).

As part of the processing sequence, machine learning algorithms may be used to analyze the data recorded with geophones (vertical and/or horizontal) placed at the surface of the earth and/or inside an underground structure (where available). Such machine learning algorithms may assist in deriving different features of the signal and noise that could be used to infer where new underground structures could exist based on pattern recognition techniques or other data.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method for detecting an underground archeologic structure based on 3D high resolution seismic comprising:
    transmitting P (longitudinal)-waves and S (shear)-waves into the earth with one or more transmitters;
    receiving and recording reflected P (longitudinal)-waves and reflected S (shear)-waves using one or more receivers located on the surface of the earth;
    receiving and recording reflected P (longitudinal)-waves and reflected S (shear)-waves using one or more receivers located beneath the surface of the earth; and
    generating seismic images generated from P-waves, SH waves, and PSv waves; and
    identifying the underground archeologic structure based on a differentiation between the one or more receivers located on the surface of the earth and the one or more receivers located beneath the surface of the earth.

2. The method of claim 1 wherein the one or more receivers located on the surface of the earth are configured to record a seismic wavefield in an X direction, a Y direction, and a Z direction.

3. The method of claim 1 wherein the one or more receivers located beneath the surface of the earth are configured to record a seismic wavefield in an X direction, a Y direction, and a Z direction.

4. The method of claim 1 wherein a P-wave transmitter is used to generate the longitudinal waves, converted PSv waves, or both and a shear wave transmitter is used to generate SH waves.

5. The method of claim 1 wherein the one or more receivers located on the surface of the earth comprise a geophones and a GPS receiver.

6. The method of claim 5 wherein the one or more receivers located on the surface of the earth further comprise a global navigation satellite system.

7. The method of claim 1 wherein one or more transmitters, the one or more receivers located on the surface of the earth, and the one or more receivers located beneath the surface of the earth are distributed in a non-uniform distribution, a pseudorandom distribution, or a combination thereof.

8. The method of claim 1 wherein the one or more receivers located on the surface of the earth or the one or more receivers located beneath the surface of the earth are configured to determine seismic absorption (attenuation factor), scattering effects, the effect of the multiples that could occur inside the underground structures, or any combination thereof.

9. The method of claim 1 which further comprises deriving one or more high resolution images of the underground structure from a full waveform inversion of wave velocities and reflectivity values.

10. The method of claim 9 wherein the full waveform inversion further comprises using a seismic wavefield comprising reflections, refractions, transmitted waves, multiples, diffractions, or any combination thereof.

11. The method of claim 1 which further comprises deriving one or more high resolution images of the underground structure using an algorithm selected from RTM, LSRTM, Kirchhoff, or any combination thereof.

12. A method for detecting an underground archeologic structure based on 3D high resolution seismic comprising:
    transmitting P (longitudinal)-waves and S (shear)-waves into the earth with one or more transmitters;
    receiving and recording reflected P (longitudinal)-waves and reflected S (shear)-waves using one or more receivers located on the surface of the earth;
    identifying the underground archeologic structure based on seismic images generated from P-waves, Sh waves, and PSv waves.

13. The method of claim 12 wherein the one or more receivers located on the surface of the earth are configured to record a seismic wavefield in in an X direction, a Y direction, and a Z direction.

14. The method of claim 12 wherein the one or more receivers located beneath the surface of the earth are configured to record a seismic wavefield in in an X direction, a Y direction, and a Z direction.

15. The method of claim 12 wherein a P-wave transmitter is used to generate the longitudinal waves, converted PSv waves, or both and a shear wave transmitter is used to generate SH waves.

16. The method of claim 12 wherein the one or more receivers located on the surface of the earth are configured to determine seismic absorption (attenuation factor), scattering effects, the effect of the multiples that could occur inside the underground structures, or any combination thereof.

17. The method of claim 12 which further comprises deriving one or more high resolution images of the underground structure from a full waveform inversion of wave velocities and reflectivity values and wherein the full waveform inversion further comprises using a seismic wavefield comprising reflections, refractions, transmitted waves, multiples, diffractions, or any combination thereof.

18. A system for detecting an underground archeologic structure comprising:
- one or more transmitters configured to transmit P (longitudinal)-waves and S (shear)-waves into the earth;
- one or more receivers located on the surface of the earth configured to receive and record reflected P (longitudinal)-waves and reflected S (shear)-waves;
- one or more receivers located beneath the surface of the earth configured to receive and record reflected P (longitudinal)-waves and reflected S (shear)-waves;
- a processor configured to differentiate between the one or more receivers located on the surface of the earth and the one or more receivers located beneath the surface of the earth to identify the underground archeologic structure.

19. The system of claim 18 wherein the one or more transmitters, the one or more receivers located on the surface of the earth, and the one or more receivers located beneath the surface of the earth are distributed in a non-uniform distribution, a pseudorandom distribution, or a combination thereof.

20. The system of claim 18 wherein the processor is configured to employ a full wave form inversion and derive one or more high resolution images of the underground structure.

\* \* \* \* \*